US005127290A

United States Patent [19]

Warner et al.

[11] Patent Number: 5,127,290

[45] Date of Patent: Jul. 7, 1992

[54] METHOD FOR TRIMMING OR DRESSING OF ABRASIVE FINISHING TOOLS

[75] Inventors: R. Brown Warner, Westlake; Alfred F. Scheider, Orange; Joseph P. Gaser, Euclid, all of Ohio

[73] Assignee: Jason Inc., Cleveland, Ohio

[21] Appl. No.: 723,813

[22] Filed: Jul. 1, 1991

[51] Int. Cl.[5] .......... B23B 1/00; A46D 9/02

[52] U.S. Cl. .......... 82/47; 82/92; 300/21

[58] Field of Search .......... 82/92, 46, 47, 93-97, 82/1.11; 51/DIG. 17; 300/10, 11, 21, 17; 83/508, 452, 13

[56] References Cited

U.S. PATENT DOCUMENTS

| | | | |
|---|---|---|---|
| 1,248,394 | 11/1917 | Pfeifer | 82/92 |
| 1,430,737 | 10/1922 | Harwood | 82/47 |
| 2,267,850 | 12/1941 | Vskakoff | 300/21 |
| 3,489,463 | 1/1970 | Hudson et al. | 300/17 |
| 4,557,167 | 12/1985 | Cvacho | 82/47 |
| 4,621,551 | 11/1986 | Silverman | 82/148 |

FOREIGN PATENT DOCUMENTS

| | | | |
|---|---|---|---|
| 656306 | 1/1938 | Fed. Rep. of Germany | 82/58 |
| 87384 | 10/1969 | France | 300/17 |
| 897416 | 1/1982 | U.S.S.R. | 82/57 |

*Primary Examiner*—Larry I. Schwartz
*Assistant Examiner*—Kevin J. Carroll
*Attorney, Agent, or Firm*—Renner, Otto, Boisselle & Sklar

[57] ABSTRACT

A method for trimming or dressing the filaments of abrasive finishing tools to an exact and uniform length to create a precision face by means of a rotatable turntable having a cutting surface upon which a finishing tool may be axially mounted and fixedly engaged. A circular cutting blade positionally adjustable relative to the filament ends, trims the filaments by cutting action of the blade in compressive contact with the filaments against a slightly yieldable cutting surface upon rotation of the turntable, the cutting blade counter rotating without power and being self-sharpened upon contact with the abrasive filaments.

10 Claims, 3 Drawing Sheets

METHOD FOR TRIMMING OR DRESSING OF ABRASIVE FINISHING TOOLS

FIELD OF THE INVENTION

This invention relates to a method for cutting the tips of abrasive finishing tool filaments to exact and uniform length.

BACKGROUND OF THE INVENTION

In the manufacture and remanufacture of precision flexible abrasive finishing tools, particularly those of annular configuration, a necessary step requires the termination of each filament to an exact and uniform length to create an accurate working face to the tool suitable for use in precision applications. Many such tools are today used on precision machining centers, computer numerical controlled machine tools, robots and other special machinery.

Existing methods of trimming the ends of abrasive tool filaments, initially developed for production of wire brushes, have deficiencies and inadequacies which are particularly apparent when applied to the production of tools using plastics such as nylon wherein particulates of abrasive material are homogeneously embedded throughout the filaments. The abrasives may include silicon carbide, aluminum oxide, polycrystalline diamond, or other hard abrasive minerals, and may constitute up to 50% or more of the filament. The extreme abrasiveness of these materials makes trimming such filaments difficult. Known methods of filament trimming include the use of sharpened dies, carbide rotary cutting blades, rotating shear blades, milling cutters, and resinoid, vitrified or metal bonded wheels. These methods induce premature and excessive wear of the cutting tools, and produce inaccurate and inconsistent abrasive finishing tools unsuitable for use in finishing precision products in the above described applications.

SUMMARY OF THE INVENTION

The present invention provides a method for trimming the ends of filaments of annular abrasive tools to exact and exactly uniform lengths producing a concentric circular tool face. According to the invention, an annular tool is mounted axially upon a rotatable turntable and with the filaments extending over a somewhat yieldable cutting surface such as ADIPRENE®, may be made from a polyurethane material sold by the Uniroyal Chemical Company.

A cover clamp is placed over the tool about the axis of the turntable and clamped against the filaments by a screw or fluid actuator keeping the tool and filaments in position upon the turntable, while compressing the filaments against the cutting surface, annularly adjacent to the face to be trimmed or cut. A cutting wheel is axially mounted upon a positionally adjustable bracket which is relatively movable with respect to the tool clamped on the turntable. The cutting wheel edge is fixed in close cutting contact with the filament tips and with pressure against the cutting surface. The circular cutting edge of the wheel is positioned substantially tangent to the circular cutting face desired to be formed on the tool. A bevelled and self-sharpening edge of the cutting wheel cuts through the filaments and bears against the cutting surface. The turntable is then rotated rather slowly about its axis and the non-powered cutting wheel rotates in an opposite direction to effect cutting of the filaments about the periphery of the tool to an exact and uniform length to form a precise circular face on the tool. The rate of cutting action is selectively controllable by the rate of in-feed of the cutting wheel and rotational speed of the turntable.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

Further objects and advantages of the invention will become apparent from the following detailed description made with reference to the accompanying drawings, wherein.

DESCRIPTION OF PREFERRED EMBODIMENTS

Figure 1:
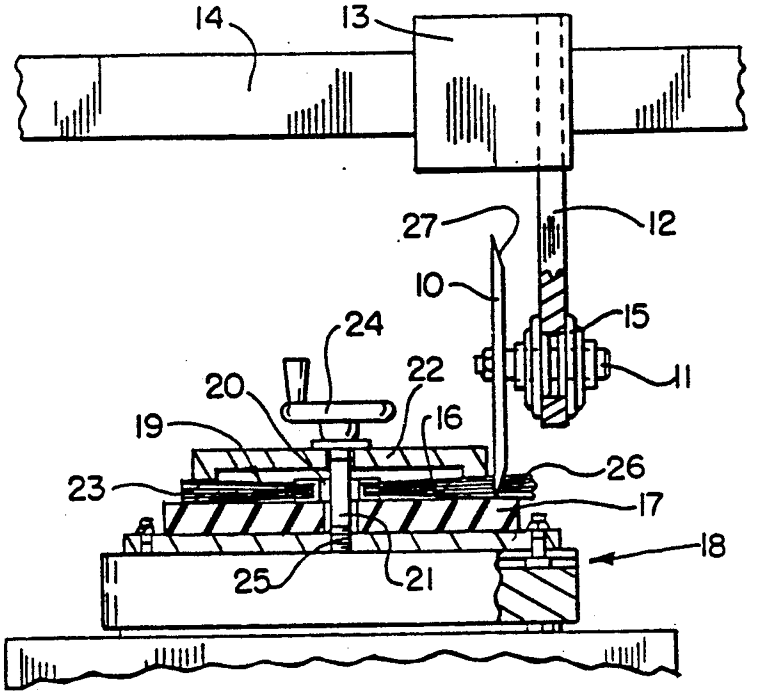
FIG. 1 is a side elevation partially broken away and in section of a filament trimming apparatus applied to a wheel-type tool wherein the filaments extend radially of the hub and showing the cutting wheel positioned perpendicular to the array of filaments or parallel to, but offset from, the axis of the tool.

FIG. 1 illustrates a preferred embodiment of the invention applied to a wheel-type tool wherein the filaments extend radially from and in the same plane as the tool hub and are radially arrayed from the axis of rotation. The circular cutting blade 10 is mounted upon an axle 11 supported by a cutting blade bracket 12 suspended from an adjustable slide 13 attached to crossrail 14. The cutting blade axle is further supported by journals 15 press fit onto each end of a hole in the cutting wheel bracket 12. The cutting blade 10 is selectively positioned along the crossrail 14 normal to the plane of the filaments 16 by adjustment of slide 13 and bracket 12 to slice transversely through filaments 16 at the desired point of termination against cutting surface 17. The cutting blade bracket 12 may also be vertically adjustable relative to crossrail 14 to position the blade relative to the tools and to vary cutting pressure. Alternatively, or in addition, the turntable supporting the tool may be vertically removable.

A turntable, indicated generally at 18, is horizontally positioned in relative proximity to the range of such motion of blade 10. The abrasive tool shown at 19 is in a disc or wheel configuration wherein the filaments 16 extend radially from and in the same plane as the tool hub 20. The tool hub 20 is placed over a centering bushing on the turntable pin 21 and rests flatly upon the cutting surface 17. A tool cover clamp 22 is positioned over tool 19 and placed centrally about the turntable pin 21. The downward facing axial rim 23 of tool cover clamp 22 comes into contact about the entire face of filaments 16 adjacent to the working face to be cut. The tool cover clamp 22 is mechanically driven against the filaments of turning crank 24 secured to the top of the pin with the engagement 25 driving the tool cover clamp 22 toward the cutting surface 17, thereby compressing the filaments 16 between the rim 23 of the tool cover clamp 22 and the cutting surface 17. The filaments 16 are thereby placed in a tightly compressed flattened configuration against the cutting surface 17, and are securely held in place for the adjacent cutting to an exact and uniform length.

Upon rotation of the turntable 18 about its axis, the filament tips 26 are severed by the resulting rolling and cutting action of the cutting blade 10 bringing the bevelled cutting edge 27 into cutting contact with each filament about the periphery of the tool. It should be noted that the bevelled edge 27 of cutting wheel 10 is angled away from the tool hub 20 to facilitate a slicing action as the cutting wheel rotates through the filaments and to provide a straight, even and uniform edge at the finished filament tips 26. The slicing action of bevelled edge 27 of cutting blade 10 into the filaments also acts to sharpen the bevelled edge 27 as a result of the continuous abrasive action of the filaments against edge 27.

Figure 2:
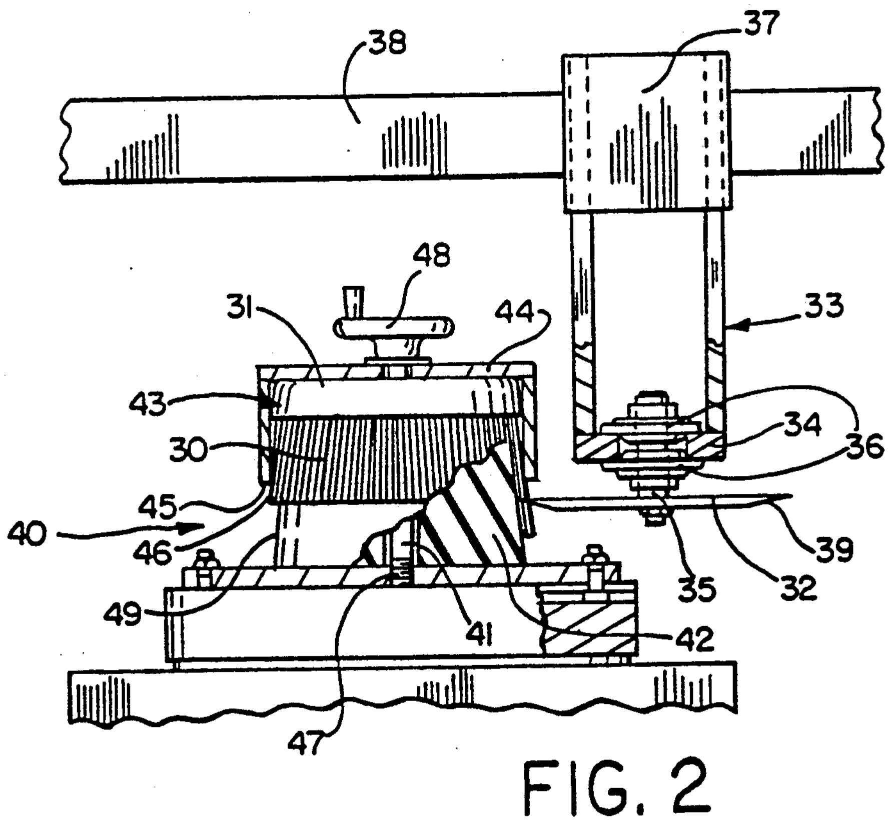
FIG. 2 is a side elevation partially broken away and in section of a filament trimming apparatus as applied to tools wherein the filaments are positioned to extend axially from the hub of the tool, wherein the hub is in the form of a cup, and the cutting surface is in the form of a cone or cylinder within the axially extending array of filaments.

FIG. 2 illustrates another preferred embodiment of an abrasive tool trimming apparatus, as applied to filaments 30 which extend generally axially of the tool hub 31, such as the cup tool or brush illustrated. To position the cutting blade 32 normal to the length of the filaments the cutting wheel 32 is mounted on a bracket, indicated generally at 33, having a horizontal section 34 through which the cutting wheel axle 35 is mounted and supported by journals 36. The cutting wheel bracket 33 is suspended from an adjustable slide 37 attached to crossrail 38.

A turntable 40 includes a vertical pin 41 and a somewhat conical cutting surface 42 over which a cup tool 43 is placed with filaments 30 extending downwardly over the exterior of the cutting surface. A tool cover clamp 44 is placed over the tool hub and filaments and includes an annular wall which extends downward to annular rim 45 which leaves only the filament tips 46 exposed. The tool cover clamp 44 is securely clamped upon the tool by threaded engagement 47 of turntable pin 41 upon turning of crank handle 48. The annular rim 45 of the tool cover clamp 44 acts evenly and uniformly to compress the filament tips 46 against the conical cutting surface 42.

With the tool securely attached to the turntable 40, and the edge of cutting blade 32 in contact with filaments 30 and cutting surface 42, the turntable is rotated by a powered mechanical means relatively slowly, for example, approximate range 20 to 100 r.p.m., about its axis 41 thereby inducing a counter-rotating cutting motion of cutting blade 31 about the circumference of the tool. It will be appreciated that the bevelled edge 39 of cutting blade 32 is directed away from the bristle tips to achieve an exact and uniform finishing face to the brush.

Figure 3:
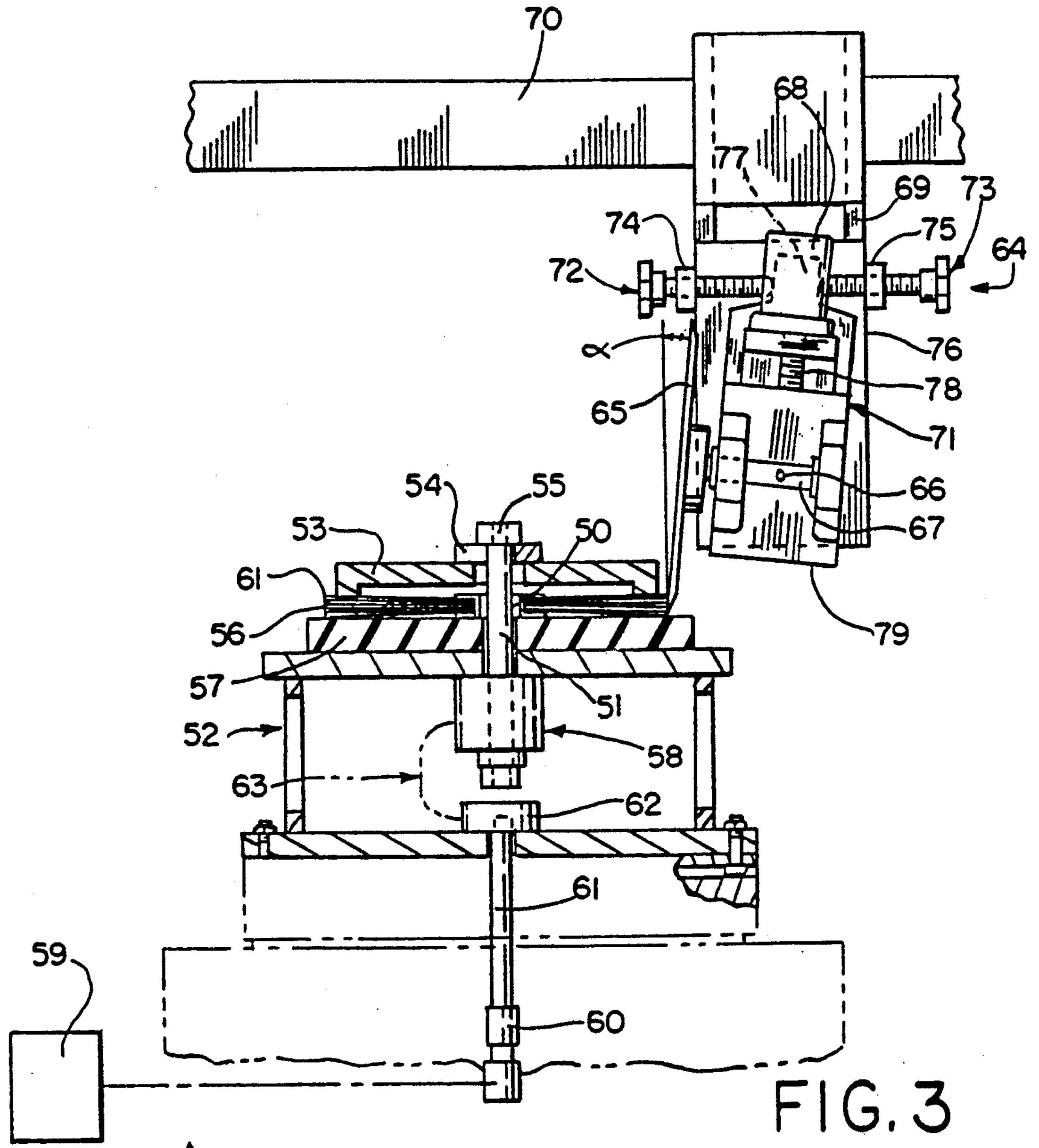
FIG. 3 is a side elevation partially broken away and in section of another form of apparatus using a pneumatic clamp and an angularly adjustable cutting wheel for trimming wheel-type tools.

FIG. 3 illustrates another embodiment of an abrasive finishing tool trimming apparatus. In this embodiment, the tool hub 50 is mounted about an axial pin 51 of a turntable, indicated generally at 52. A tool cover clamp 53 is placed over the tool about pin 51 and held in place by insertion of "C" key 54 about pin 51 between cover 53 and pin head 55. The rim of the tool cover clamp 53 is brought into compressive contact with filaments 56 against cutting surface 57 by fluid piston cylinder assembly 58, which exterts downward pressure on pin 51. Fluid pressure is supplied from source 59 through rotary coupling 60, line 61, hub 62 and flexible hose 63.

FIG. 3 further illustrates an alternative embodiment of a cutting blade assembly, indicated generally at 64, in which the cutting blade 65 is pivotally adjustable about pivot point 66 and movable perpendicular to its axle 67 by servo motor 68. The cutting blade support bracket 69 is slideably adjustable along overhead crossrail 70 to allow lateral movement of the entire cutting blade assembly. The cutting blade axle 67 is journalled on movable slide of a cutting blade housing 71 by the pillow blocks shown and such housing is pivotally attached at 66 to support bracket 69.

Opposing adjustment screws 72 and 73 are threaded through supports 74 and 75 respectively, said supports being fixed to the outer walls 76 of bracket 69. The tips of screws 72 and 73 apply laterally opposing forces to the projection 77 of the cutting blade housing 71. Setting the housing 71 positions the cutting blade, for example, at an acute angle $\alpha$ relative to a line normal to the plane of the tool filaments 56. Angle adjustment of the cutting blade housing 71 allows the filaments to be cut at angles of varying degrees, or to be cut exactly and uniformly flush regardless of any filament deformation which may occur as a result of compression of the filaments between the tool cover clamp 53 and the turntable cutting surface 57.

The servo motor 68 is mounted on the motor bracket illustrated and rotates screw 78 threaded in the movable slide 79 on which the pillow blocks are mounted. The motor then moves the slide perpendicular to the axle of the blade 65.

Figure 4:
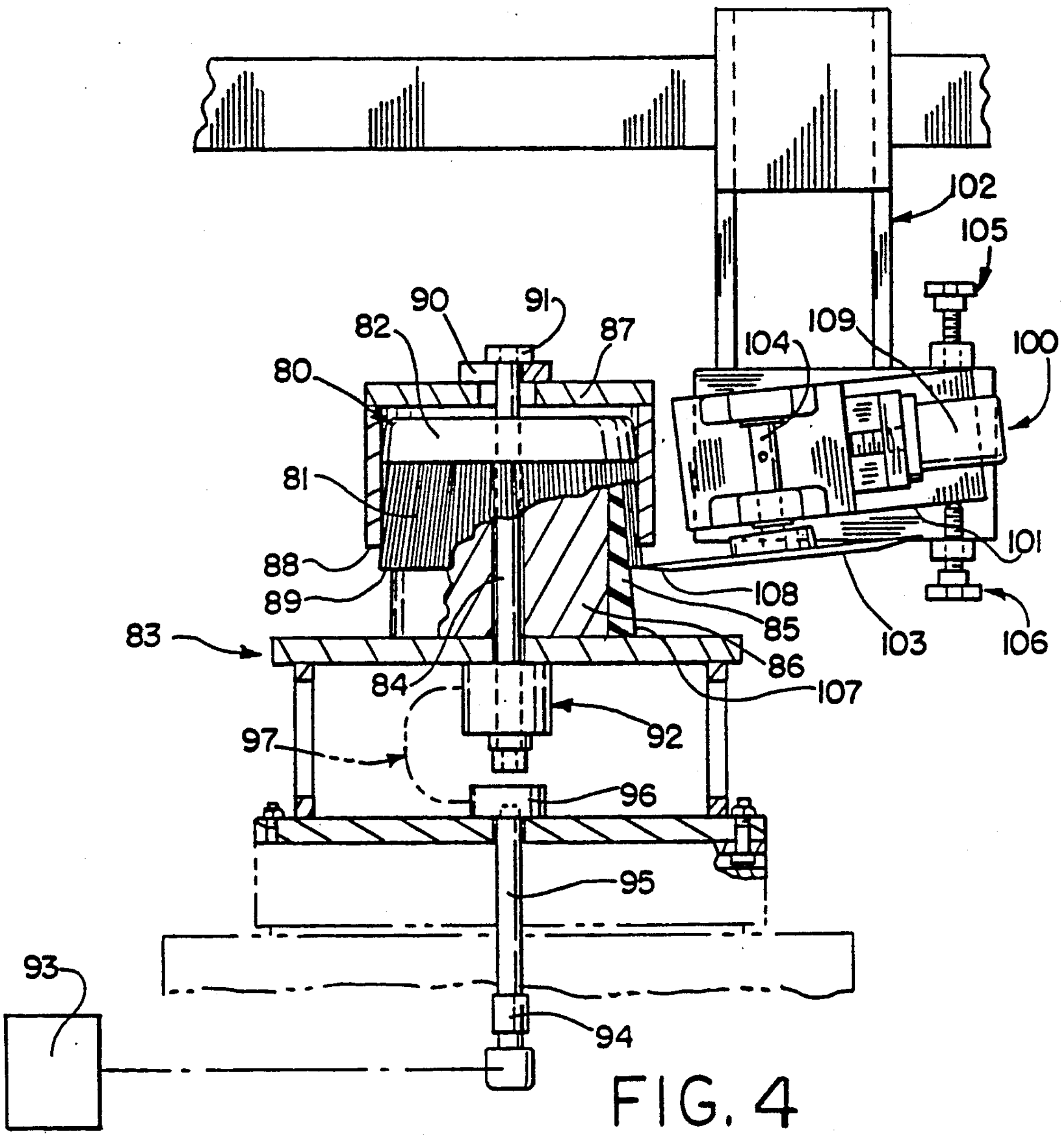
FIG. 4 is a similar side elevation of such modified apparatus trimming cup-type tools.

FIG. 4 illustrates the embodiment of an abrasive finishing tool trimming apparatus as shown in FIG. 3 but applied to an annular tool 80 in which the filaments 81 extend substantially parallel to, but flare out slightly from the axis of rotation of annular tool hub 82. Annular tool 80, with filaments 91 extending downward from the tool hub 82, is placed upon turntable 83 about the turntable pin 84 and over a conical cutting surface 85 of the same somewhat resilient material positioned about the periphery of cylindrical turntable core 86. A tool cover clamp 87 is positioned over the tool hub 82 and extends downward over the filaments 81 to rim 88 leaving only the filament tips 89 exposed. The tool cover clamp 87 is drawn down upon the tool by fluid driven retraction of pin 84 by fluid piston cylinder assembly 92, causing the inside egde of rim 88 of cover clamp 87 to press filament tips 89 against conical cutting surface 85. Fluid pressure is supplied to the piston assembly 92 from source 93 through rotary coupling 94, line 95, hub 96, and flexible hose 97.

The cutting wheel assembly, indicated generally at 100, is shown in FIG. 4 in an alternative position wherein the cutting blade axle housing 101 is rotated approximately 90 degrees relative to the vertical support bracket 102. Cutting blade 103 is alernatively attached to the downward pointing end of the cutting blade axle 104 thereby correctly positioning the cutting blade 103 perpendicular to the filament tips 99. The cutting blade axle housing 101 is again offset relative to the center line of bracket 102 and fixed in place by set screws 105 and 106 to set the cutting blade perpendicular to the pitched angle 107 of cutting surface 95. This insures a uniform and flush finishing face to the tool regardless of any deformation of the filaments as they are compressed against the cutting surface by the tool cover clamp. The cutting edge 108 of the cutting blade is moved toward or away from the filament tips 99 by servo motor 109 driving the slide as in FIG. 3.

Figure 5:
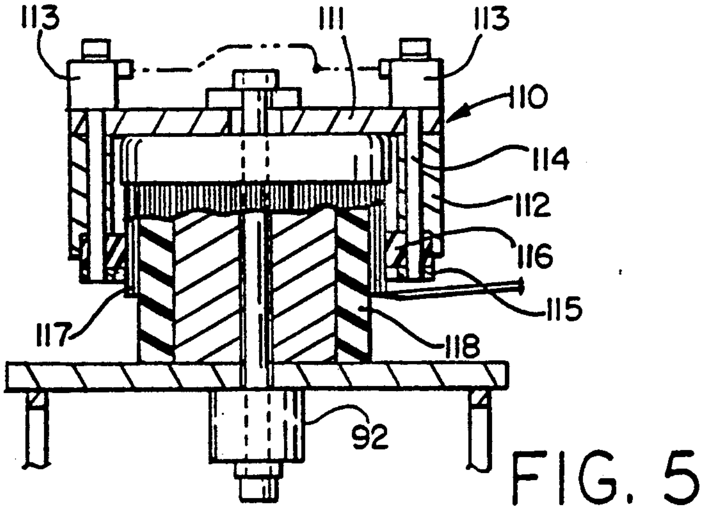
FIG. 5 is an elevation partially in section of a modified tool cover clamp using a deformable ring.

FIG. 5 illustrates another embodiment of a fluid driven compression tool cover clamp. This embodiment is particularly suited for trimming annular tools in which the filaments extend exactly parallel to the tool hub axis. The tool cover clamp 100 consists of a top horizontal plate 111, and an annular wall 112. Piston cylinder assemblies 113 the rods 114 of which extend from the cylinders through wall to be secured to annular end plate 115. An elastomeric collar 116 is positioned between the end plate 115 and the shoulder seat at the bottom of the wall 112 as in FIG. 4, the entire clamp is pulled down by piston-cylinder assembly 92. Elastomeric collar 116 bulges inwardly to compress the filament tips 117 against vertical cutting surface 118 upon fluid driven upward retraction of pistons and rods 114. This draws end plate 115 upwardly which squeezed the elastomeric collar against the end of annular wall 112, and compressing vertically positioned bristles or filaments directly against cutting surface 118 adjacent the desired point of trim.

Figure 6:
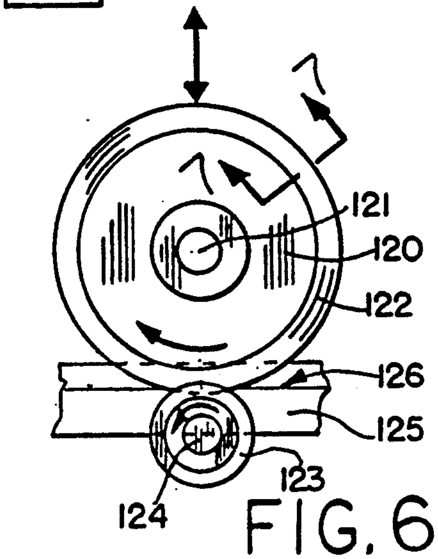
FIG. 6 is a fragmentary view of the cutting apparatus where the cutting wheel runs against a roller cutting surface with abrading tool material such as strip being fed or pulled therebetween.

FIG. 6 illustrates an embodiment of the abrasive tool trimming apparatus adapted to trim filaments arranged in a continuous planar side-by-side configuration. As shown from the side, cutting blade 120 rotates clockwise about a cutting blade axle 121. Bevelled cutting edge 122 of cutting wheel 120 interfaces with the cutting surface 123 of backing roller 124 which is journalled upon base 125. The filaments in a strip configuration, for example, are drawn across the base or table between the nip of the blade and rotating surface 126. The filaments are thus moved from right to left and sliced off as they pass through the interface of cutting blade bevelled edge 122 and cutting surface 123.

Figure 7:
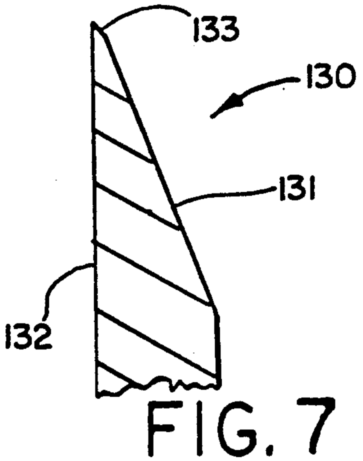
FIG. 7 is an enlarged cross-sectional view of the edge of the cutting blade showing the bevelled self-sharpening edge as seen, for example, from the line 7—7 of FIG. 6.

FIG. 7 illustrates a double-angled bevelled edge 130 of the cutting blade. Surface 131 is at an agnle of, for instance, 20 degrees relative to the bottom surface 132 of the cutting blade. Surface 133 is at, for instance, an angle of 35 degrees relative to the bottom surface 132 of the cutting blade. The secondary cutting angle of surface 133 increases the strength and fracture resistance of the cutting edge and facilitates the self-sharpening action on the cutting edge as it comes into continuous contact with abrasive filaments. The slow rate at which the turntable is rotated, for instance, between 20 and 100 r.p.m., facilitates the accuracy of the cutting process and prolongs the life of the cutting blade.

With the present invention, a wide variety of abrading tools using abrasives homogeneously distributed in plastic filaments, both round and rectangular in section, may be trimmed and dressed to provide precise tool faces for use in the precision applications noted above.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A method for trimming and dressing abrasive filaments of finishing tools comprising the steps of placing a finishing tool upon a rotatable turntable having a cutting surface, positioning a cutting blade mounted on an adjustable bracket in cutting contact with said filaments and against said cutting surface, and rotating said turntable to pass each filament to be trimmed through a cutting interface of said cutting blade and the cutting surface of said turntable.

2. The method of claim 1 wherein the cutting edge of the cutting blade is sharpened upon continuous contact with the abrasive filaments.

3. The method of claim 1 including the step of rotating the turntable slowly.

4. The method of claim 1 including the step of rotating the turntable by powered mechanical means.

5. The method of claim 1 including the step of selectively positioning the cutting blade to achieve a flat and uniform finishing surface to the filaments being trimmed.

6. The method of claim 1 including the step of selectively positioning the cutting blade by powered mechanical means.

7. The method of claim 1 including the step of fixedly engaging a tool cover clamp over the finishing tool upon the turntable and cutting surface to hold the finishing tool and filaments in place for trimming.

8. The method of claim 7 including the step of tightening the tool cover clamp upon the finishing tool and turntable by threaded screw means.

9. The method of claim 7 including the step of compressing the tool cover clamp upon the finishing tool and turntable by fluid power means.

10. The method of claim 9 including the step of compressing the filaments against the cutting surface of the turntable by compressing an elastomeric ring to induce expansion of said elastomeric ring against the filaments and cutting surface.

* * * * *